United States Patent [19]
Desurvire et al.

[11] Patent Number: 5,757,529
[45] Date of Patent: May 26, 1998

[54] IN-LINE REGENERATING APPARATUS FOR REGENERATING A SOLITON-CONVEYED SIGNAL BY SYNCHRONOUSLY MODULATING THE SOLITONS BY MEANS OF A NON-LINEAR OPTICAL LOOP MIRROR

[75] Inventors: Emmanuel Desurvire, Bruyeres Le Chatel; Sébastien Bigo, Palaiseau, both of France

[73] Assignee: Alcatel N.V., Rijswijk, Netherlands

[21] Appl. No.: 570,858

[22] Filed: Dec. 12, 1995

[30] Foreign Application Priority Data

Dec. 23, 1994 [FR] France ................... 94 15555

[51] Int. Cl.$^6$ .................. H04B 10/16; H04B 10/04
[52] U.S. Cl. ............. 359/179; 359/158; 359/181; 359/188; 359/156
[58] Field of Search .................... 359/158, 161, 359/173, 188, 181, 179, 156, 135; 385/15

[56] References Cited

U.S. PATENT DOCUMENTS

| | | | |
|---|---|---|---|
| 5,309,267 | 5/1994 | Huang | 359/158 |
| 5,369,520 | 11/1994 | Avramopoulos et al. | 359/158 |
| 5,548,433 | 8/1996 | Smith | 359/158 |

OTHER PUBLICATIONS

Lucek et al., "All Optical Signal Regenerator" Optics Letters, vol. 18, No. 15, Aug. 1, 1993.

Nakazawa et al. "80GBit/s Soliton Data Transmission Over 500KM with Unequal Amplitude Soitons for Timing Clock Extraction", *Electronics Letters*, vol. 30, No. 21, Oct. 13, 1994, pp. 1777/1778 XP 000476409.

Jinno M et al. "All–Optical Regenerator Based on Nonlinear Fibre Sagnac Interferometer", *Electronics Letters*, vol. 28, No. 14, Jul. 2, 1992, pp. 1350–1352, XP 000307842.

Sandel D et al. "Polarization–independent Regenerator with Nonlinear Optoelectronic Phase–Locked Loop", *Optical Fiber Communication*, OFC'94, Technical Digest, vol. 4, No. FG2, Feb. 20–25, 1994, pp. 310–311.

*Primary Examiner*—Kinfe-Michael Negash
*Attorney, Agent, or Firm*—Sughrue, Mion, Zinn, Mackpeak & Seas, PLLC

[57] ABSTRACT

The apparatus of the invention regenerates solitons in-line by synchronously modulating the solitons using a non-linear optical loop mirror as an optical modulator, the NOLM modulator being controlled by a clock signal recovered from the soliton signal by clock recovery means which may be all-optical means or electro-optical means. The NOLM includes an input coupler which may be a 50/50 coupler or an asymmetrical coupler. Said input coupler may be a 2x2 coupler or a 3x3 coupler. In a particular embodiment, the regenerating system further includes a plurality of optical amplifiers and a plurality of "guiding" filters. Application to long-distance soliton optical telecommunications.

13 Claims, 4 Drawing Sheets

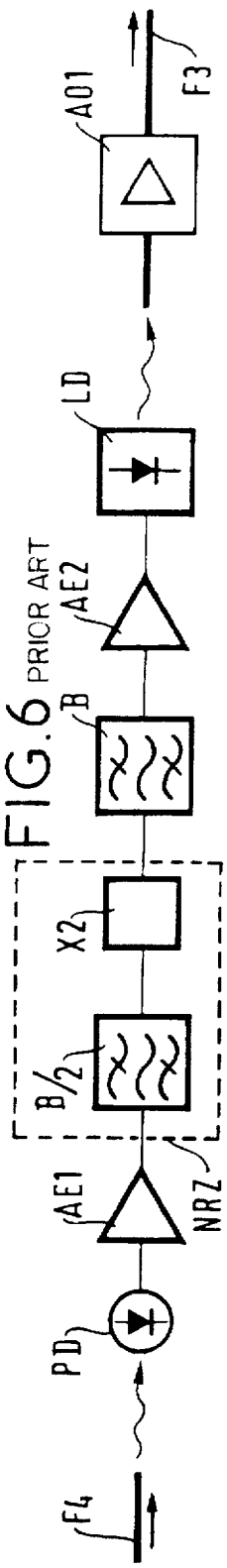
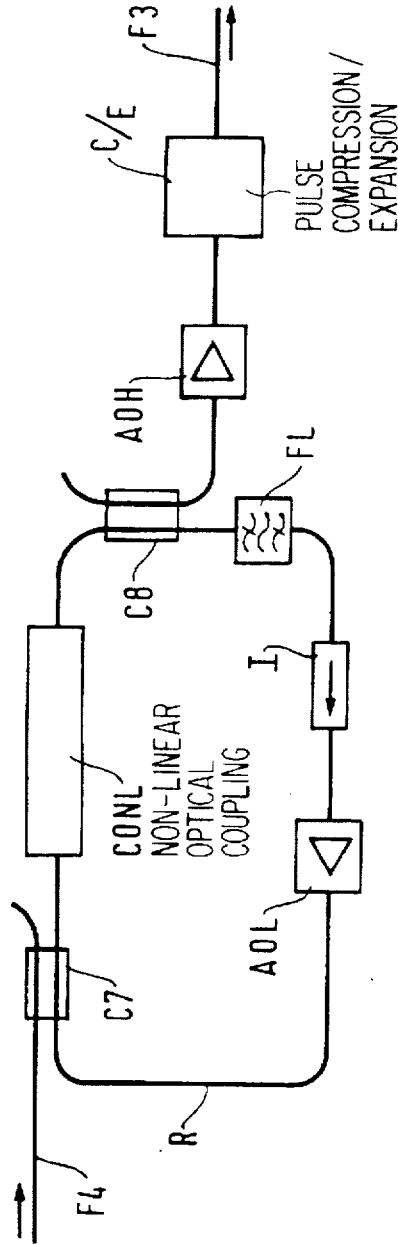
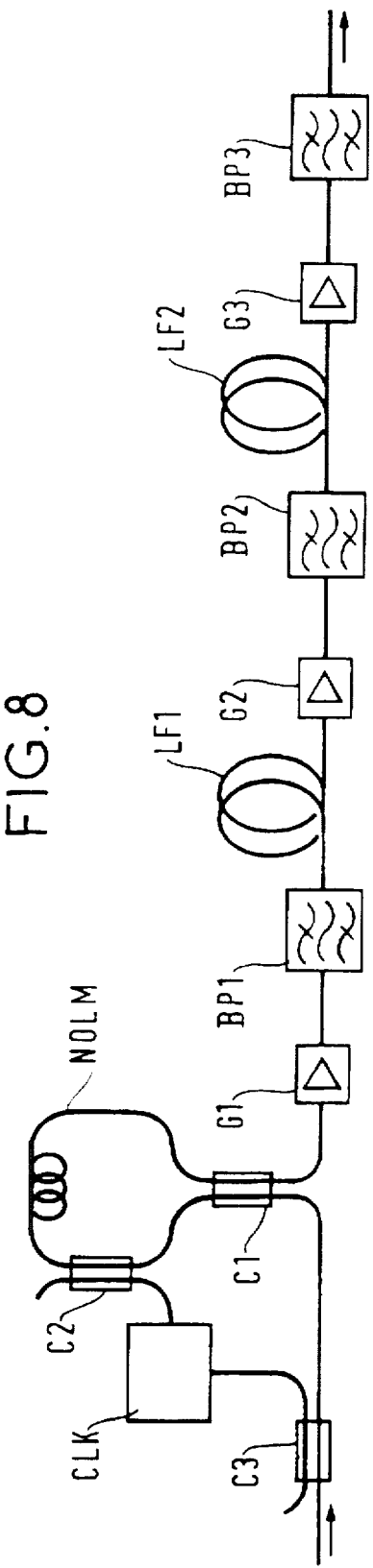

IN-LINE REGENERATING APPARATUS FOR REGENERATING A SOLITON-CONVEYED SIGNAL BY SYNCHRONOUSLY MODULATING THE SOLITONS BY MEANS OF A NON-LINEAR OPTICAL LOOP MIRROR

FIELD OF THE INVENTION

The invention relates to optical fiber telecommunications, and more particularly to long-distance telecommunications. For very long distance optical-fiber links, use of a "soliton" type signal is known. Such a signal has special spectrum properties that enable it to propagate along the dispersive fiber without any significant chromatic dispersion, i.e. the dependence of the refractive index on the intensity of the signal is used to counteract chromatic dispersion, or vice versa. The spectrum shape of the signal is conserved in spite of the effects of propagation distance, which effects are thus mainly constituted by line losses. Such line losses can be compensated by in-line optical amplification, e.g. by means of an Erbium doped fiber amplifier (EDFA).

BACKGROUND OF THE INVENTION

For soliton transmission with in-line amplification (EDFA), the following known problems remain to be solved:

1) Gordon-Haus jitter which causes timing uncertainty on arrival of the bits of the signal; and 2) noise accumulation coming from spontaneous emission in the optical amplifiers being amplified.

Various solutions have been proposed and described in the following documents which are expressly incorporated in the present application as descriptions of the prior art:

1) Self-filtering by means of a non-linear amplifying loop mirror (NALM). Document D1: M. Matsutomo et al., (1994) "Suppression of noise accumulation in bandwidth-limited soliton transmission by means of non-linear loop mirrors", Optics Letters v. 19, No. 3, pp. 183–185, Feb. 1, 1994. In the teaching of that document, the line losses of the soliton signal are mitigated by amplification imparted in a fiber loop containing amplification means, the NALM apparatus acting as an amplifier component having non-linear gain and a high bit-rate. The amplifying apparatus selectively amplifies the solitons, and to a lesser extent amplifies the noise accumulated outside the spectrum domain of the solitons, in particular noise coming from amplified spontaneous emission (ASE).

2) Guiding and sliding filtering. Document D2: L. F. Mollenauer et al., (1992) "The sliding-frequency guiding filter: an improved form of soliton jitter control", Optics Letters v. 17, No. 22, pp. 1,575–1,577, Nov. 15, 1992. That method uses passive components only, but it limits maximum transmission distance because the noise coming from ASE increases exponentially with distance. This is because periodic filtering by the guiding filters gives rise to increased line losses which must be compensated by increased gain at each optical amplification stage. The noise in the spectrum windows of the filters is then also amplified at each amplification stage, but it is never filtered out by the guiding filters. The amplitude of the noise multiplied at each amplifier then reaches considerable proportions and increases exponentially with transmission distance.

3) Synchronous modulation with filtering. Document D3: H. Kubota and M. Nakazawa, (1993), "Soliton transmission control in time and frequency domains", IEEE J. Quantum Electronics v. 29, No. 7, pp. 2,189–2,197, July 1993, uses calculation to demonstrate the theoretical advantage of that method (see diagram FIG. 8). No practical solution is recommended, but reference is made to a transmission experiment at 10 Gbit/s over 1 million kilometers in Document D4: Nakazawa et al., (1991), "Experimental demonstration of soliton data transmission over unlimited distances with soliton control in time and frequency domains", Electronics Letters, v. 29, No. 9, pp. 729–730, Apr. 29, 1993.

Document D4 teaches use of an optical modulator made of $LiNO_3$ for synchronously modulating solitons, as shown diagrammatically in FIG. 2. The problem with that solution is that the bit-rate of signals to be regenerated cannot exceed in the range 20 Gbit/s to 30 Gbit/s (10 Gbit/s in Document D4). The $LiNO_3$ modulator is controlled by an electronic control signal generated in a clock circuit on the basis of the in-line soliton signal. The clock recovery means comprise an optical coupler C3 for extracting a portion of the optical signal that propagates between the input F1 and the output F2, a clock extraction circuit CLKX, a delay line for supplying a delay GM, and an amplifier GM for supplying the control power necessary to cause the $LiNO_3$ modulator to operate. FIG. 2 also shows the following accessories: an input optical amplifier (EDFA) for mitigating the insertion losses of the regeneration circuit, birefringent polarization controllers (PC), and a band-pass filter BP for narrowing down the spectrum distribution of the energy from the solitons. Some of these accessories can be found in preferred embodiments of the invention that are described below.

A regeneration system is also known for regenerating an optical signal in the form of a bit stream constituted by light pulses for the "1" bits and no pulses for the "0" bits at predetermined moments that are known to a clock. Document D5: J. K. Lucek and K. Smith, (1993) "All-optical signal regenerator", Optics Letters, v. 18, No. 15, pp. 1,226–1,228, Aug. 1, 1993. The system described in Document D5 is shown in FIG. 3 and is described below.

Other documents are useful for understanding the present invention better, and they are introduced briefly with mention being made of how they are useful for this purpose. Those documents are also expressly incorporated in the present application as descriptions of the prior art.

Document D6: N. Finlayson et al., (1992) "Switch inversion and polarization sensitivity of the nonlinear optical loop mirror (NOLM)", Optics Letters, v. 17, No. 2, pp. 112–114, Jan. 15, 1992. That document teaches that the NOLM may be configured as a switch that is insensitive or not very sensitive to the polarization of the light signal to be switched when operating under linear conditions, and that the birefringence of the loop can contribute to the instabilities observed in mode-locked ring lasers.

Document D7: K. Uchiyama et al., (1992) "Ultrafast polarisation—independent all-optical switching using a polarization diversity scheme in the nonlinear optical loop mirror (NOLM)", Electronics Letters, v. 28, No. 20, pp. 1,864–1,866, Sep. 24, 1992. That document shows the use of a NOLM as a switch which is made insensitive to the polarization of the light from the signal to be switched. This is achieved by using a polarization-maintaining fiber that has been cut and rotated through 90° at the mid-point of the loop of the NOLM. The principle is shown in FIG. 5.

For example, the loop of the NOLM is constituted by a PANDA polarization-maintaining fiber having two holes. By rotating the polarization-maintaining fiber through 90° between axis A1 and axis A2 at the half-way stage of propagation, the fast axis of the left portion becomes the slow axis of the right portion of the loop as shown in FIG. 5, and the slow axis of the left portion becomes the fast axis of the right portion. The fiber of the loop (L) is polarization dispersive, i.e. the propagation speed of light inside the fiber is different for polarization aligned with the fast axis than for polarization orthogonal to the fast propagation axis, i.e. the slow axis of the fiber. It is necessary to overcome the polarization dispersion. This achieved by using two identical lengths of fiber so that the axes A1 and A2 of the polarization-maintaining fiber are disposed mutually orthogonally, thereby cancelling the polarization dispersion.

In order to make the system independent from the polarization of the switched signal, the polarization of the control signal that is inserted into the loop L by the coupler C2 over the control input fiber F3 is injected at 45° to the two orthogonal axes A1, A2. In the same way as above, the effects of polarization dispersion cancel out.

Document D8: L. E. Adams et al., (1994) "All-optical clock recovery using a mode-locked figure-eight laser with a semiconductor nonlinearity", Electronics Letters, v. 30, No. 20, pp. 1,696–97, Sep. 29, 1994. That document teaches the use of a mode-locked laser for performing all-optical clock-recovery. All-optical clock-recovery may be used in the apparatus of the invention and it is described in more detail below with reference to FIG. 7.

Document D9: D. Sandel et al., (1994): "Polarization-independent regenerator with nonlinear optoelectronic phase-locked loop", optical fiber conference proceedings 1994, paper FG2. That document describes the use of a NOLM having a 3×3 coupler at its main input. In an embodiment of the invention, such a 3×3 coupler is used to obtain a certain phase relationship, as taught in that document. By using such a 3×3 coupler, instead of a 2×2 coupler, an asymmetrical phase shift is imparted in the loop of the NOLM. The deterioration in the extinction ratio as a result of the mean pumping power (or the level to which the loop is filled with the clock signals) as seen by the counter-propagating signals can be eliminated by the phase shift, if the various parameters are chosen appropriately.

The system disclosed in D5 and shown in FIG. 3 uses a non-linear optical loop mirror (NOLM) to modulate a clock signal at a first wavelength $\lambda_h$=1.56 μm by the stream of bits of a signal to be regenerated, the signal being at a second wavelength $\lambda_s$=1.54 μm. The resulting modulated clock signal then constitutes the regenerated signal, which has thus changed wavelength (1.56 μm at the output instead of the 1.54 μm of the input signal).

That document teaches that the clock signal is recovered from the signal inserted over the input fiber F1, the signal being recovered by mode-locking a ring laser RL having a ring fiber, so as to generate a stream of clock pulses at the rate of the bits of the signal, with jitter that is reduced by the mode-locking of the laser. As is well known in the art, the ring laser consists of wavelength-dependent optical couplers C5 and C3, allowing the data signal to pass through from fiber F1 to optical amplifier GS, while circulating the wavelength of laser AOL. The loop is tuned to match the clock signal, as shown in FIG. 7, described below. The stream of clock pulses is extracted from the ring laser by the coupler C6, from where it passes through an optical isolator I and apparatus for mechanically adjusting the transit time FS before it is applied to the input 1 of the coupler C1 of the NOLM. The input signal at $\lambda_s$=1.54 μm is inserted into the loop L of the NOLM along the input fiber F3 via the coupler C2, and may be extracted at fiber F4, via wavelength-dependent coupler C4. The birefringent polarization controllers PC are adjusted so as to make the NOLM fully reflective to a clock signal that is present at the input 1 of the coupler C1 (reflective towards the input 1) in the absence of an input soliton signal at the coupler C2. In contrast, when a "1" bit of the signal is inserted into the NOLM via the coupler C2, it performs switching which allows the clock signal to pass, which clock signal is output along the output fiber F2 via the output 2 of the coupler C1 without any timing jitter.

The NOLM is therefore used as a switch controlled by the bits of the signal to be regenerated, which switch switches the clock signal "on" when the bit of the signal is "1" (the NOLM is transparent to the clock signal) and "off" when the bit of the signal is "0" (the NOLM is reflective to the clock signal).

The time window of that bit of the signal which constitutes the command to switch the NOLM is widened relative to the clock signal so as to guarantee that the signal to be regenerated is insensitive to jitter (see p. 1,227, left-hand column, last paragraph of D5). This is accomplished by using relative "walk-off" between the signal inserted by C2 and the clock signal in the co-propagation direction (clockwise in the figure), due to the chromatic dispersion between the two wavelengths used.

The system proposed by Lucek and Smith is not suitable for regenerating solitons for the following reasons:

1) A major drawback is the change in the wavelength of the signal.
2) Problems remain with respect to practical implementation of the Lucek and Smith system (D5), because the NOLM is sensitive to the polarization of the soliton signal, while the polarization of the soliton signal supplied to command switching of the NOLM is not determined.

The polarization controllers (referenced PC in FIG. 1 of D5) are adjusted so as to reflect the clock signal back towards port 1 in the absence of the "1" bit of the signal (see D5, p. 1,227, left-hand column, last paragraph). But this adjustment needs to be monitored because it is dependent on environmental parameters (temperature, vibrations, etc.).

The operating reliability of such apparatus in practice would seem to be far from sufficient compared with these problems.

OBJECTS AND SUMMARY OF THE INVENTION

An object of the invention is to mitigate the problems suffered by the prior art.

To this end, the invention provides in-line regenerating apparatus for regenerating a soliton optical signal by performing synchronous modulation on the solitons, said apparatus including:

clock signal recovery means enabling the clock rate to be extracted from the bits of the signal to be regenerated; and modulation means enabling the amplitude of the solitons to be modulated by said clock signal;

wherein said modulation means are constituted by a non-linear optical loop mirror (NOLM).

In a variant, said apparatus further includes a first filter for stopping the wavelength of said clock signal, while allowing said solitons to pass therethrough. In a preferred variant, said clock recovery means are all-optical means, with no optical-to-electronic or electronic-to-optical transducer means. In another variant, said clock recovery means are opto-electronic means comprising optical-to-electronic transducer means and electronic-to-optical transducer means, together with electronic amplification means and electronic filtering means, and shaping means for shaping the electronic signals.

In a particular embodiment, said NOLM includes a 50/50 coupler for coupling the input-output signals towards the loop of said NOLM.

In an advantageous embodiment, the coupling coefficient of said coupler is chosen to be asymmetrical, so as to make it possible to adjust the relative size of the amplitude modulation and of the frequency modulation that are imparted by said NOLM. In a particular embodiment, said coupler is a 3×3 coupler, i.e. a coupler having six ports. In a particularly advantageous embodiment, the clock signal is approximately in the form of a sine-wave.

According to a characteristic, the apparatus of the invention further includes at least one first optical amplifier compensating for the line losses of energy from the solitons. According to another characteristic, the apparatus of the invention further includes at least one "guiding" second filter capable of filtering out spectrum noise imparted by said at least one optical amplifier, and of reducing the spectrum width of the solitons while increasing their time width. According to another advantageous characteristic, the apparatus of the invention further includes at least one second optical amplifier, capable of compensating for energy losses from the solitons when they pass through said guiding filter(s).

BRIEF DESCRIPTION OF THE DRAWINGS

The invention will be better understood, with its various characteristics and advantages, on reading the following detailed description given with reference to the accompanying drawings, in which:

FIG. 6 diagrammatically shows an example of optoelectronic clock-recovery apparatus for recovering the clock from an optical signal, the apparatus using principles known to persons skilled in the art;

FIG. 7 diagrammatically shows an example of all-optical clock-recovery apparatus for an optical signal, the apparatus using known principles of mode-locking a ring-fiber laser;

FIG. 8 diagrammatically shows a soliton signal transmission system of the invention comprising regeneration apparatus of the invention together with a plurality of line optical amplifiers and a plurality of guiding filters.

The drawings are given by way of non-limiting example so as to illustrate the principles of the invention and of certain variants. In all of the figures, like references refer to like elements, and, for reasons of clarity, the drawings are not always to scale.

MORE DETAILED DESCRIPTION

Figure 1:
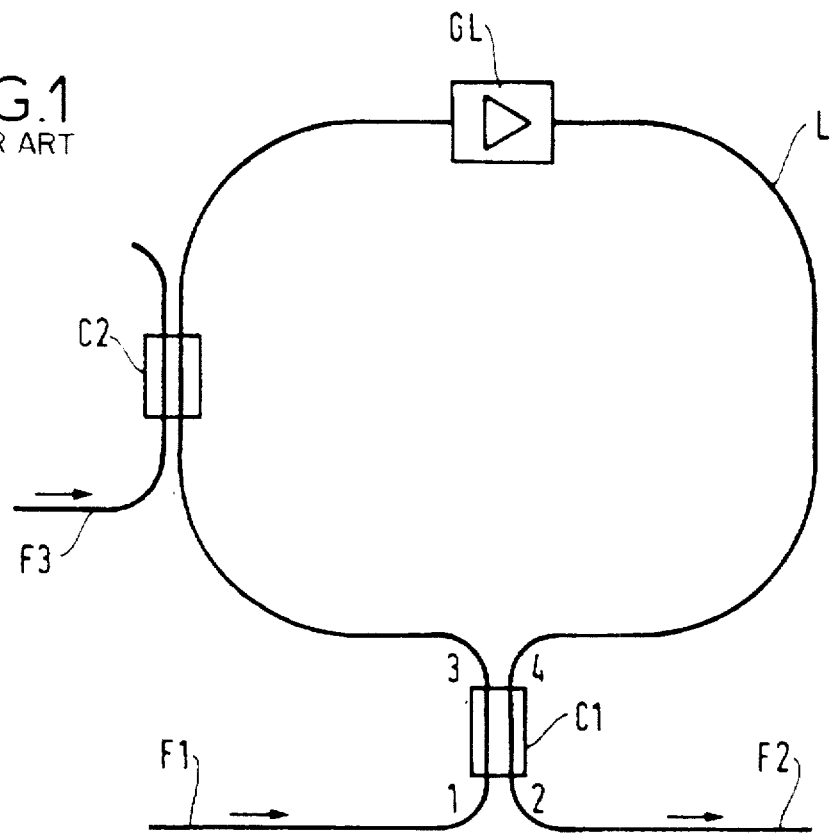
FIG. 1 diagrammatically shows an example of a prior art non-linear optical loop mirror (NOLM) that is suitable for being used in the apparatus of the invention.

FIG. 1 diagrammatically shows an example of a prior art non-linear optical loop mirror (NOLM) suitable for being used in the apparatus of the invention. In general, the NOLM comprises an optical fiber loop L, a first optical coupler C1 with its four ports 1, 2, 3, 4, the coupler C1 having a coupling coefficient that describes the optical power sharing between the various ports, and a second optical coupler C2 for injecting a control signal into the NOLM via the control optical fiber F3.

Optionally, an optical amplifier GL may be added to the loop so as to impart positive gain to the resulting assembly, thereby making it a non-linear amplifying loop mirror (NALM) as described in Document D1.

The optical signal to be switched by the NOLM is inserted via the input fiber F1 at port 1 of the coupler C1. Firstly, a description is given of the case when the coupler C1 has a coupling coefficient of 50/50, in the absence of a control signal in the fiber F3. In this case, 50% of the power of said optical signal is located at port 4, while the other 50% is located at port 3 of the coupler C1, but with a relative phase shift of $\pi/2$ radians (90°) between the two. The two signals therefore propagate in opposite directions around the fiber loop which has a length in the approximate range 5 km to 10 km. Since the optical path lengths of the two signals are identical, the signals arrive respectively at ports 3 and 4 of the coupler C1, where they interfere with each other.

Since the two signals are phase shifted by $\pi/2$, destructive interference occurs for the resulting wave going towards port 2 of the coupler C1. The signal is therefore not transmitted to the output fiber F2. In contrast, the interference is constructive for the resulting wave going towards port 1 of the coupler C1. The signal applied at port 1 is therefore totally reflected by the NOLM towards port 1 in this case.

Consideration is given below to the case when a control signal is present in the control optical fiber F3. This signal is coupled to the loop of the NOLM by the optical coupler C2, and it propagates clockwise around the loop. The signal waves that are flowing in the opposite direction around the loop are unaffected or almost unaffected by the presence of a control signal. But the signal waves that are propagating in the same direction around the loop are disturbed. The fiber of the loop L exhibits a non-linear effect which changes the refractive index of the fiber as a function of optical power, or more exactly as a function of the amplitude of the electric field in the fiber (Kerr effect). The electric fields of the waves that are flowing together, which waves are said to be "co-propagating", are superposed on one another linearly. The resulting intensity of the electric field is therefore greater than that of the waves that are propagating in the other direction around the loop L.

The effective refractive index of the loop L as seen by the co-propagating waves is different from that seen by the counter-propagating waves. Their propagation speeds are therefore different. Their times of arrival at the coupler C1 are different, and so the waves do not interfere with one another, or do not interfere with one another very much. All or almost all of the optical power is located at port 2 of the coupler C1 and is conveyed along the output optical fiber F2.

Thus, the presence of a control signal in the control fiber F3 is capable of causing the non-linear optical loop mirror to switch, so that it is transparent in the presence of the control signal, and reflective in the absence of a control signal. Switching can be very fast, i.e. of the order of at least 100 GHz. By inserting a birefringent element in the loop of the NOLM, it is possible to reverse the switching characteristics so as to make the mirror transparent in the absence of the control signal, and reflective in the presence of a control signal, as recalled in the introduction of Document D6 which deals with the problems of sensitivity to polarization of the signals when such apparatus is operating under non-linear conditions.

Figure 3:
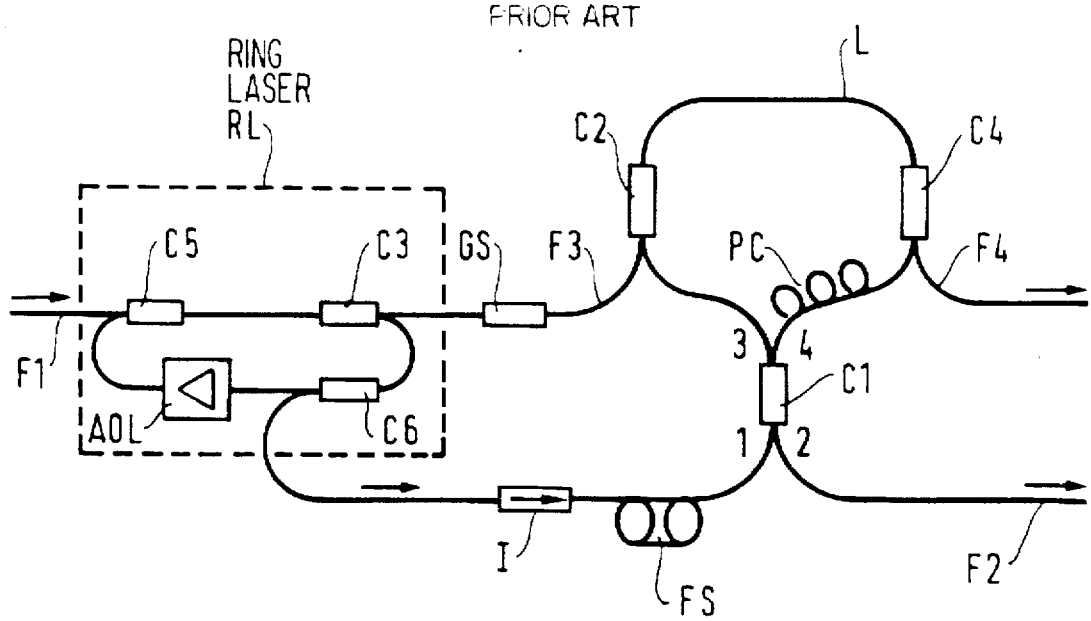
FIG. 3 (already described) diagrammatically shows prior art apparatus for regenerating solitons by switching a clock signal by means of a NOLM, the apparatus being disclosed in Document D5.

The above-described NOLM complies with the NOLM used in the apparatus shown in FIG. 3 (already described) which diagrammatically shows prior art apparatus for regenerating solitons by switching a clock signal by means of a NOLM, disclosed in Document D5.

Figure 2:
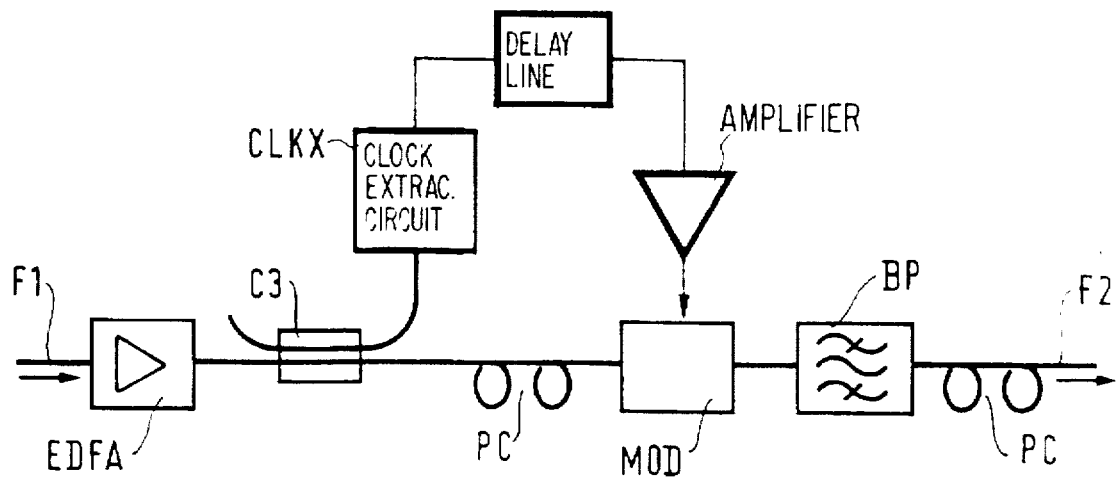
FIG. 2 (already described) diagrammatically shows prior art apparatus for synchronously modulating solitons, disclosed in Document D4.
Figure 4:
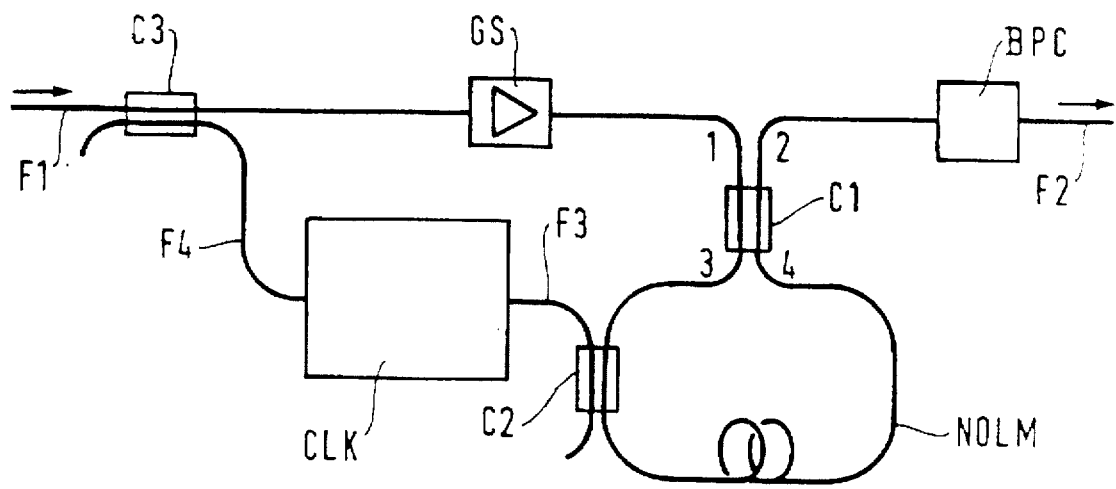
FIG. 4 diagrammatically shows an embodiment of apparatus of the invention for synchronously modulating solitons, in which apparatus the modulator is a NOLM.

In order to mitigate the drawbacks of the prior art as shown in FIGS. 2 and 3, the invention provides in-line regenerating apparatus for regenerating soliton-type optical signals by synchronously modulating the solitons by means of a NOLM as shown diagrammatically in FIG. 4. Whereas in the prior art the NOLM is used mainly as a fast optical switch, the invention proposes to use it as an amplitude modulator.

In the apparatus shown in FIG. 4, the soliton-type optical signal to be regenerated arrives via the input optical fiber F1 where a tapping optical coupler C3 takes a portion of the signal sent through fiber F4 so as to extract a clock signal therefrom by clock recovery means CLK. The means CLK then apply the optical clock signal to the control input of the NOLM via the coupler C2. The soliton signal is always at the same wavelength $\lambda_s$. The wavelength $\lambda_h$ of the clock signal is preferably slightly different from that of the soliton signal $\lambda_s$, so as to enable the clock to be filtered out at the output of the apparatus by a band-pass filter BPC whose passband is centered on the wavelength $\lambda_s$ of the soliton, having an output to fiber F2.

Downstream from the tapping coupler C3, the soliton signal continues to propagate along the input optical fiber F1 until it reaches the input port 1 of the coupler C1 of the NOLM. In a variant of the invention, an optical amplifier GS may be placed upstream from the NOLM so as to compensate for the line losses suffered by the soliton since the last time it was amplified or regenerated.

NOLM operation is similar to that described above with reference to FIG. 1. The solitons arriving at port 1 of the coupler C1 of the NOLM have their signal split between ports 3 and 4, which have a relative $\pi/2$ phase shift. Solitions at port 2 are thus modulated by the clock signal that is applied at the control input F3 via the control coupler C2. The propagation times of the clock and of the solitons along their respective paths must be adjusted as in the apparatus shown in FIG. 3, so as to enable the signals to be synchronized when they flow through the NOLM.

The soliton signal is thus modulated by the envelope of the clock signal, thereby making it possible to achieve amplitude modulation of the solitons. Amplitude modulation is considered sufficient to reduce or even eliminate Gordon-Haus jitter at the output of the regenerating apparatus.

Figure 5:
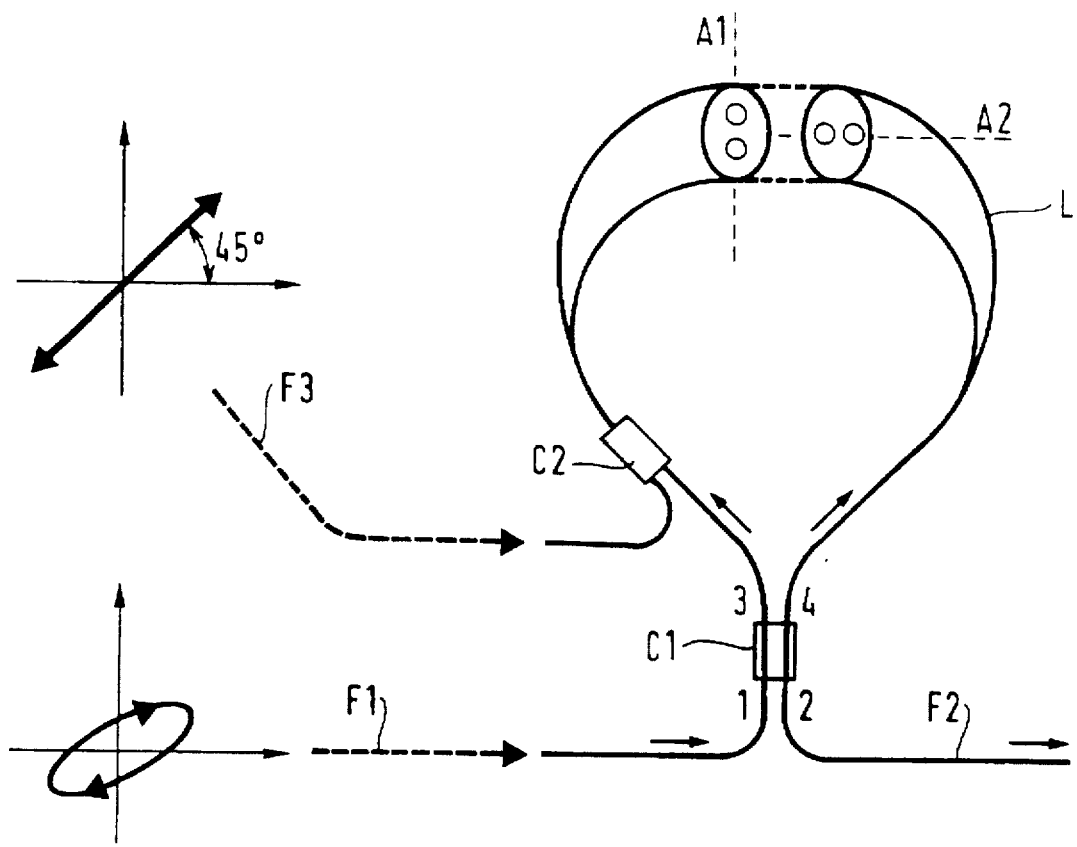
FIG. 5 (already described) diagrammatically shows a prior art NOLM switch that is insensitive to the polarization of the signal to be switched, the switch being disclosed in Document D7.

It is preferable to use a polarization-maintaining fiber to implement the NOLM of the invention, as shown in FIG. 5 (already described). The optical clock signal is injected into the NOLM via the coupler C2 with its polarization axis angularly positioned at 45° relative to the polarization-maintaining axes A1, A2 in the loop fiber L. Operation of the apparatus is thus insensitive to the polarization of the soliton signal to be modulated, and this is a major advantage compared with prior art apparatus, and in particular compared with the apparatus shown in FIG. 3. In the FIG. 3 apparatus, the soliton signal constitutes the control signal of the NOLM, entering via coupler C2 which signal has a polarization that is arbitrary, that is unknown, and that cannot be kept under control. The sensitivity of the NOLM to the polarization of the signal can therefore adversely affect the performance levels of that prior art apparatus.

The clock recovery means CLK may be either all-optical means (see FIG. 7), or opto-electronic means (see FIG. 6).

FIG. 6 diagrammatically shows an example of opto-electronic clock recovery apparatus for an optical signal, which apparatus uses principles that are known to persons skilled in the art. The optical signal taken by the tapping coupler C3 as shown in FIG. 4 propagates along the optical fiber F4 until it reaches a photo-detector PD which converts the optical signal into an electronic signal. The resulting electronic signal is firstly amplified by a microwave electronic amplifier AE1, then, when the signal is a non-return-to-zero (NRZ) signal, two additional components are added, shown in box NRZ. The signal is filtered by a first band-pass filter B/2. In the example shown in FIG. 6, and for an NRZ signal, the filtered signal is then frequency multiplied by a frequency doubler X2, and it is then subjected to further band-pass filtering in a second filter B. When the signal is a soliton signal, filter B constitutes the first filter. The signal is then amplified electronically by amplifier AE2 so as to control a diode laser LD which emits a light signal at the rate of the electronic pulses which result from the optical signals taken at C3. The optical signal may optionally be amplified by an optical amplifier AO1 prior to being applied to the control input of the NOLM via the control fiber F3 and via the coupler C2 shown in FIG. 4.

FIG. 7 diagrammatically shows an example of all-optical clock recovery apparatus for recovering the clock from an optical signal, which apparatus uses known principles of mode-locking a ring-fiber laser. The soliton-type optical signal taken by the tapping coupler C3 of FIG. 4 propagates along the optical fiber F4 until it reaches a fiber loop R to which it is coupled via coupler C7. The fiber loop R and the various optical components disposed therein form a ring laser as described above with reference to FIG. 3 (reference RL) or as described in Document D8 by L. E. Adams et al. The ring laser includes optical amplification means AOL, an optical isolator I for one-way operation, optical filtering means FL centered on the wavelength of the laser light, and non-linear optical coupling means CONL making it possible to obtain amplitude and/or phase non-linearities as a function of the amplitude of the electric field of the light flowing through the fiber R. For example, the non-linear means CONL may be a NOLM as described with reference to the preceding figures or in Document D8.

The ring laser can operate continuously (CW) in the absence of a soliton signal injected via the coupler C7. But, as soon as a stream of bits is inserted via the coupler C7, an asymmetrical non-linear phase shift is imparted between components in the counter-propagation direction, the transmittivity of the NOLM is increased, and the ring laser is mode-locked at the rate of the bits of the signal. The pulses can then be taken via the optical coupler C8 so as to give a clock signal that is substantially without timing jitter. In order to make the signal easily usable for the purpose of synchronous modulation, FIG. 7 shows a second optical amplifier AOH and compression and/or expansion means C/E for giving the desired shape to the pulses output by the ring laser (amplitude, duration, rising and falling pulse shape, etc.). The raw pulses are relatively narrow, and it may be desirable to broaden them before they are used. In this way, the clock signals supplied over the optical fiber F3 are optimized for the desired use.

FIG. 8 diagrammatically shows a soliton signal transmission system of the invention comprising regenerating apparatus of the invention (C3, CLK, C2, C1, NOLM) together with a plurality of line optical amplifiers (G1, G2, G3, etc.) and a plurality of guiding filters (BP1, BP2, BP3, etc.). The guiding filters compress the spectrum width of the solitons, but, in doing so, they remove energy from the solitons. That is why the gain of the in-line amplifiers must be greater than the line losses suffered by the solitons over the optical fibers (LF1, LF2, etc.) between the amplifiers (G1, G2, G3, etc.). By reducing the spectrum width of the solitons, the timing jitter is also reduced by the guiding filters, as explained in Document D2.

Figure 9:
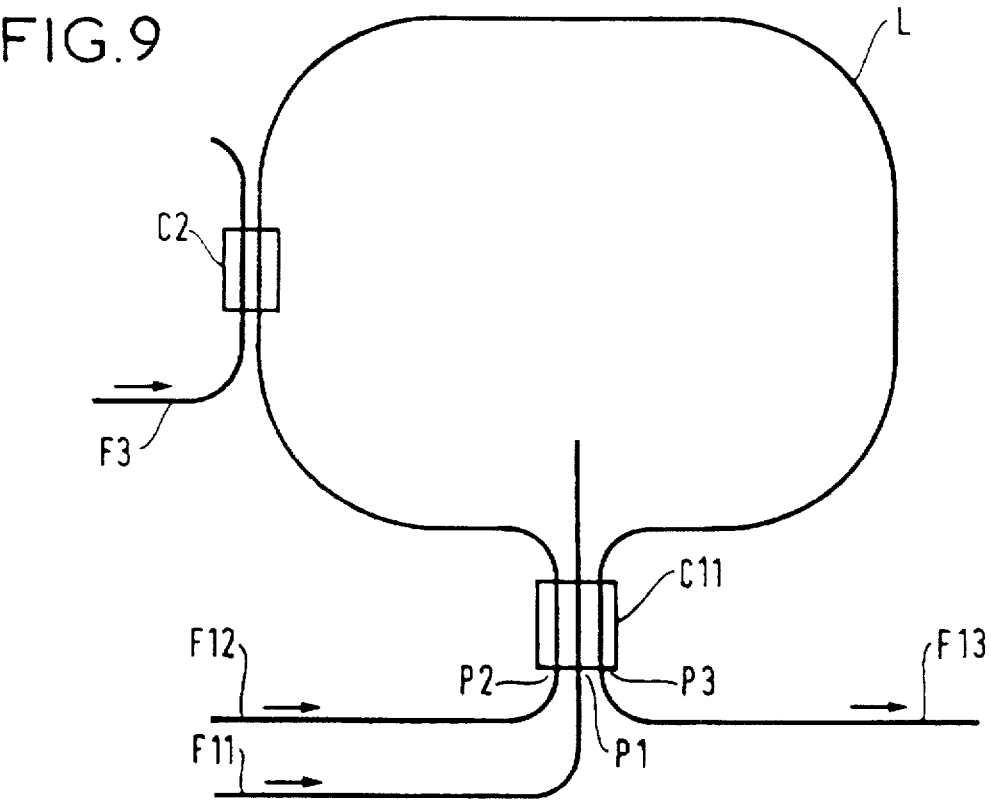
FIG. 9 diagrammatically shows an example of a prior art non-linear optical loop mirror (NOLM) with a 3×3 optical coupler at its main input, the NOLM being suitable for use in the apparatus of the invention.

FIG. 9 diagrammatically shows an example of a prior art non-linear optical loop mirror (NOLM) with a 3×3 optical coupler C11 at its main input, this NOLM being suitable for being used in the apparatus of the invention. By using a 3×3 coupler instead of a 2×2 coupler, an asymmetrical phase shift is imparted in the loop of the NOLM. The deterioration in the extinction ratio as a result of the mean pumping power (or the level to which the loop is filled with the clock signals) as seen by the counter-propagating signals can be eliminated by the phase shift, if the various parameters are chosen appropriately.

The 3×3 coupler has six ports, including three input ports P1, P2, and P3. What is important here is the phase relationship between the various ports. With a 2×2 coupler, a phase shift of $\pi/2$ exists between the direct path (1, 3) and the crossed path (1, 4). With a 3×3 coupler, a phase-shift of $\pm\pi/3$ exists between the adjacent ports. By choosing the input/output ports appropriately, it is possible to choose the sign of the phase shift so as to impart an asymmetrical phase shift in the loop L of the NOLM. The deterioration in the extinction ratio as a result of the mean pumping power (or the level to which the loop is filled with the clock signals) as seen by the counter-propagating signals can be eliminated by the phase shift.

For example, the soliton signal may be injected over the optical fiber F11 via port P1 of the coupler C11.

The fiber F12 connected to port P2 is not connected (but merely terminated so as to avoid any interference reflection). The signals injected over fiber F11 are coupled to two other fibers F12 and F13 within the 3×3 coupler C11. The NOLM operates as in the above-described examples. The effects of phase shifting on the counter-propagating waves can be cancelled out with the asymmetrical constant imparted by the $\pi/3$ phase shift.

As in the above-described cases, the soliton signal as regenerated by synchronous modulation is applied to fiber F13 via port P3 of the coupler C11 when the clock signal is applied to the NOLM over fiber F3 via the optical coupler C2.

The apparatus of the invention is described with reference to a few embodiments only, using certain prior art apparatuses to constitute the NOLM, for recovering the clock signal and supplying it to the controlled input of the NOLM, and for solving a few minor problems that might be encountered on implementing an in-line soliton-regenerating system. Naturally, the list of embodiments of the invention is not exhaustive, and persons skilled in the art can adapt the apparatus of the invention to suit their own needs.

We claim:

1. In-line regenerating apparatus for regenerating a soliton optical signal by performing synchronous modulation on the solitons, said apparatus including:
   clock signal recovery means for extracting a clock signal from the bits of the signal to be regenerated; and
   modulation means for modulating the amplitude of the solitons by said clock signal;
   wherein:
   said modulation means are constituted by a non-linear optical loop mirror having a signal input and a control input;
   said clock signal is supplied to said control input;
   said soliton optical signal is supplied to said signal input; and
   the modulated solitons have the same wavelength as the input soliton optical signal.

2. Apparatus according to claim 1, wherein said apparatus further includes a first filter for stopping the wavelength $\lambda_h$ of said clock signal, while allowing said solitons to pass therethrough.

3. Apparatus according to claim 1, wherein said clock recovery means are all-optical means, with no optical-to-electronic or electronic-to-optical transducer means.

4. Apparatus according to claim 1, wherein said clock recovery means are opto-electronic means comprising optical-to-electronic transducer means and electronic-to-optical transducer means, together with electronic amplification means and electronic filtering means, and shaping means for shaping the electronic signals.

5. Apparatus according to claim 1, wherein said NOLM includes a 50/50 coupler for coupling the input-output signals towards the loop of said NOLM.

6. Apparatus according to claim 1, wherein said NOLM includes a coupler having an asymmetrical coupling coefficient, so as to make it possible to adjust the relative size of the amplitude modulation and of the frequency modulation that are imparted by said NOLM.

7. Apparatus according to claim 1, wherein said NOLM includes a coupler and said coupler is a 3×3 coupler.

8. Apparatus according to claim 1, wherein said clock signal is approximately in the form of a sine-wave.

9. Apparatus according to claim 1, wherein said apparatus of the invention further includes at least one first optical amplifier compensating for the line losses of energy from the solitons.

10. Apparatus according to claim 9, wherein said apparatus of the invention further includes at least one guiding second filter capable of filtering out spectrum noise imparted by said at least one optical amplifier, and of reducing the spectrum width of the solitons while increasing their time width.

11. Apparatus according to claim 10, wherein said apparatus of the invention further includes at least one second optical amplifier, capable of compensating for energy losses from the solitons when they pass through said guiding filter.

12. Apparatus according to claim 1, wherein said loop mirror contains a loop portion comprising a polarization-maintaining fiber having at least two orthogonal polarization axes.

13. Apparatus according to claim 1, wherein the control input comprises an optical coupler which injects the clock signal with a polarization axis angularly positioned at 45 degrees relative to said at least two orthogonal polarization axes.

* * * * *